United States Patent [19]
Furkert

[11] 3,943,237
[45] Mar. 9, 1976

[54] PRODUCTION OF SULFURIC ACID FROM THE SCRUBBING SOLUTION OBTAINED IN THE DESULFURIZATION OF COKE-OVEN GAS

[75] Inventor: Herbert Furkert, Grosskonigsdorf, Germany

[73] Assignee: Chemiebau Dr. A. Zieren GmbH & Co. KG., Cologne, Germany

[22] Filed: Oct. 16, 1973

[21] Appl. No.: 406,799

[30] Foreign Application Priority Data
Oct. 19, 1972  Germany............................ 2251296

[52] U.S. Cl. ............. 423/542; 423/224; 423/236; 423/541 A
[51] Int. Cl.² ........................................ C01B 17/50
[58] Field of Search .......... 423/522, 523, 526, 529, 423/531–543, 546, 541 A, 224, 236

[56] References Cited
UNITED STATES PATENTS

| | | | |
|---|---|---|---|
| 1,148,368 | 7/1915 | Evans.................................. | 423/546 |
| 2,301,650 | 11/1942 | Titlestad.............................. | 423/539 |
| 2,621,108 | 12/1952 | Hill et al............................. | 423/366 |
| 3,359,069 | 12/1967 | Furkert............................... | 423/540 |
| 3,549,320 | 12/1970 | Isbell, Jr. ............................ | 423/523 |
| 3,825,657 | 7/1974 | Jenniges............................. | 423/522 X |
| 3,838,193 | 9/1974 | Kajitani et al. ..................... | 423/366 |

FOREIGN PATENTS OR APPLICATIONS

| | | | |
|---|---|---|---|
| 2,037,619 | 2/1972 | Germany | |
| 531,753 | 10/1956 | Canada.............................. | 423/531 |
| 1,806,003 | 5/1970 | Germany ........................... | 423/522 |

*Primary Examiner*—Oscar R. Vertiz
*Assistant Examiner*—Gary P. Straub
*Attorney, Agent, or Firm*—Millen, Raptes & White

[57] ABSTRACT

Scrubbing solutions containing ammonium salts of weak acids are mixed with sufficient sulfuric acid to react with all the salts; the resultant solutions are evaporated by direct heat exchange with a hot $SO_2$-containing combustion gas to a 40–78% water content and combusted at 800°–1,250°C to produce the $SO_2$-containing combustion gas used in the evaporation step. The $SO_2$ in the combustion gas can be processed in a conventional manner.

12 Claims, 1 Drawing Figure

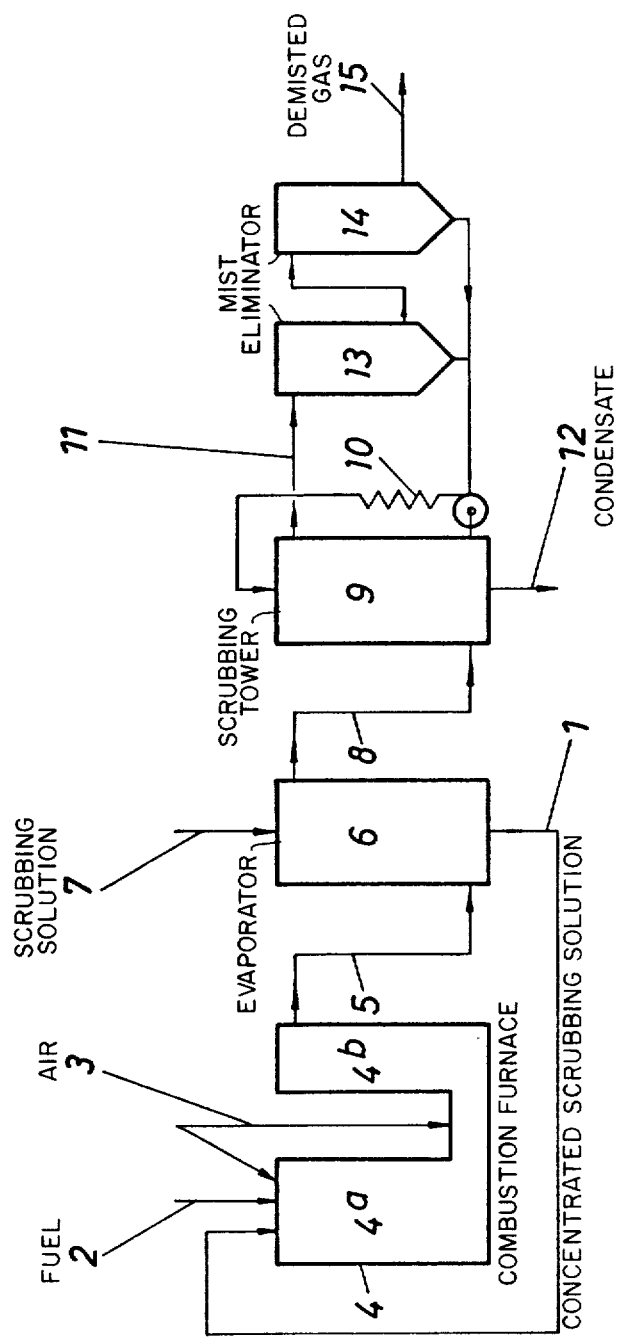

PRODUCTION OF SULFURIC ACID FROM THE SCRUBBING SOLUTION OBTAINED IN THE DESULFURIZATION OF COKE-OVEN GAS

BACKGROUND OF THE INVENTION

This invention relates to a process for the production of sulfur dioxide from an ammoniacal scrubbing solution obtained in a desulfurization process of coke-oven gas or other $H_2S$-containing gases produced from the dry distillation of fossil fuels.

In the desulfurization of coke-oven gas using ammonia, relatively dilute scrubbing solutions are produced which rarely contain more than 20% by weight of combustible components and otherwise consist of water. These solutions contain ammonium thiocyanate, ammonium thiosulfate, sulfur, and free ammonia. The elimination of these solutions represents a considerable problem. They can be burned only with a high expenditure in fuel and yield a combustion gas containing only about 1–2% by volume of $SO_2$ and thus are only of minor value for further processing, for example to produce sulfuric acid. On the other hand, the emission of this mixture into the atmosphere is likewise not feasible.

It is possible, by the combustion of such a solution with sulfur or hydrogen sulfide as the fuel, to obtain a gas having a higher $SO_2$-content (e.g., 6% by volume), suitable for sulfuric acid production. However, in this case, much more sulfuric acid must be produced than that corresponding to the sulfur content of the scrubbing solution. In general, it is undesirable to solve the problem of disposing of the scrubbing solution by such high sulfuric acid production.

Therefore, the procedure employed heretofore was limited to liberating the ammonia from these scrubbing solutions by addition of milk of lime and recovering the ammonia by distillation. In this method residues are produced whose elimination likewise presents a problem.

It is an object of this invention to provide a process for working up the scrubbing solution produced in a process of desulfurization of coke-oven gas which employs ammonia to obtain sulfuric acid in a manner harmless to the environment and in a quantity which corresponds substantially to the sulfur content of the scrubbing solution. It is a further object to provide a method for processing such scrubbing solutions with minimum fuel consumption, in spite of the low sulfur content of the solution, which generally is about 5–10% by weight. Other objects and advantages of this invention will become apparent to those skilled in the art upon further study of the specification and appended claims.

SUMMARY OF THE INVENTION

According to this invention, the scrubbing solution containing ammonia and ammonium salts of weak and strong acids is mixed with an amount of sulfuric acid at least sufficient to react with free ammonia in the solution and with the ammonia bound to weak acids; evaporating the thus-obtained mixture by direct heat exchange with a hot $SO_2$-containing combustion gas to a water content of between about 40 and 78% by weight; and combusting the thus-evaporated mixture to obtain the hot $SO_2$-containing combustion gas used in the evaporation step.

DETAILED DISCUSSION

Adding sulfuric acid to the scrubbing solution prevents the escape of the free ammonia from the solution and of the ammonia which would be hydrolytically liberated from the ammonium salts of weak acids during the evaporation step. The amount of sulfuric acid which is added must therefore be at least sufficient to bind this ammonia as ammonium sulfate. If more than this amount of sulfuric acid is added, a corresponding portion of the ammonium thiosulfate present in such solution is decomposed with the formation of ammonium sulfate into sulfur and sulfur dioxide, the latter reacting with any hydrogen sulfide still present in the solution to form sulfur and water.

The sulfuric acid can be added in concentrated or dilute form. Either pure product acid or any available waste sulfuric acid can be utilized. The waste heat of the hot combustion gas is utilized in the process by the evaporation of the scrubbing solution according to the invention. Not only does this constitute a considerable saving in fuel, it also means the sulfur dioxide in the combustion gas will be less dilute and accordingly makes more economical the further processing thereof into sulfuric acid.

The extent to which the scrubbing solution can be evaporated with the hot combustion gas depends essentially on the amount of sulfur and ammonium compounds in the solution. Only rarely would an evaporation to below 40% by weight of $H_2O$ be possible without external heating. Generally, it is preferred to concentrate the solution to between about 50 and 75%, by weight of $H_2O$. The evaporated water is discharged together with the combustion gas from the vaporation stage and can be removed therefrom by cooling. Hydrogen sulfide dissolved in the scrubbing solution cannot escape into the gaseous phase during the evaporation, because it reacts to elementary sulfur with the sulfur dioxide which is formed in the solution from ammonium thiosulfate and/or which is absorbed from the combustion gas. Thus, in the process of this invention, the volatile $NH_3$ and $H_2S$ components of the scrubbing solution cannot pass into the gaseous phase and thus contaminate the combustion gas.

During the combustion of the evaporated scrubbing solution, ordinarily at about 800°–1,250°C, preferably 900°–1,100°C, the ammonium thiocyanate and ammonium thiosulfate contained therein, as well as the ammonium sulfate formed by the addition of sulfuric acid and elemental sulfur, are oxidized in accordance with the following reactions:

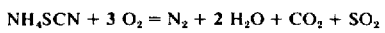
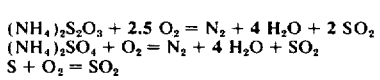

The ammonium content of the solution is oxidized completely to nitrogen and the entire sulfur content of the solution is converted to sulfur dioxide, which can then be conventionally processed to sulfuric acid. Low $SO_3$ concentrations, due to a strong oxidizing potential of the combustion gas atomosphere and/or catalytic effect, are not a disadvantage in this process, because the $SO_3$ is at least partially directly absorbed by the scrubbing solution, so that the quantity of the sulfuric acid which is added to the solution is reduced or can even be entirely eliminated.

After the condensation of the excess water and a drying step, the gas from the evaporation step contains 4–9% by volume of $SO_2$ and thus is suitable for the sulfuric acid production in a conventional manner. evaporated In accordance with the preferred embodiment of this invention, an oxygen content of from 1 to 5% by volume is maintained in the combustion gas at the outlet of the combustion chamber by metering the combustion air. At these oxygen concentrations, the ammonium ($NH_4+$) in the solution is oxidized to nitrogen gas ($N_2$) and the formation of nitrogen oxide is negligibly small. At higher oxygen contents in the combustion gas, the nitrogen oxide content thereof also increases. The resultant nitrosylsulfuric acid content in the thus-produced sulfuric acid can be reduced by the addition of urea or amidosulfonic acid. The residence time of the vaporated mixture in the combustion zone ranges preferably between 0.3 and 15 seconds. The preferred oxygen content in the combustion gas at the outlet of the combustion zone is from 1.2 to 3.5% by volume.

In another preferred embodiment of the present invention, sulfuric acid and water are condensed out of the combustion gas exiting from the evaporation step by cooling and washing and at least part of the thus-obtained sulfuric acid is added to the scrubbing solution. Residual $SO_3$ contained in the combustion gas not scrubbed out during the evaporation step forms an aqueous sulfuric acid with, for example, 10–20% by weight of $H_2SO_4$ when the gas is cooled to 102°–105°C. This acid-enriched portion of the condensate can be added to the scrubbing solution to be concentrated and then combusted. During the subsequent washing of the gas and mist removal therefrom, the water vapor is condensed, thus obtaining a sulfuric acid solution containing generally below 1% by weight of $H_2SO_4$, which is too dilute to be advantageously used in the first step of the process of this invention.

Since generally the largest portion of $SO_3$ in the combustion gas is scrubbed out of the combustion gas in the evaporation stage (especially when evaporating the scrubbing solution to the lower $H_2O$ contents within the above-mentioned range), one tower (for the $H_2O$ condensation) is sufficient instead of the two towers usually employed in sulfuric acid plants for the cooling and scrubbing of the gas. Consequently, only a slight additional expenditure, if any, in apparatus is required to provide for the concentration of the scrubbing solution. An empty steel tower with an acid-proof lining or a jet washer of rubber-covered steel is suitable for the evaporation of the scrubbing solution.

Preferably, the evaporation of the sulfuric acid-treated scrubbing solution is conducted in a jet scrubber of the Venturi tube type, which can be mounted on an empty tower. The combustion gas is fed axialy to the Venturi scrubber and the sulfuric acid-treated scrubbing solution is fed at the narrowest point of the Venturi tube, preferably at several locations distributed over the circumference. During this step, water vaporization takes place which continues in the associated tower. In the tower, the flow velocity of the gas/liquid mixture is reduced, so that the gas and liquid separate from each other. The concentrated scrubbing solution is withdrawn from the tower sump, and the gas, laden with water vapor, is removed laterally from the lower portion of the tower. In the evaporation using a Venturi scrubber, the uncooled combustion gas is employed at a temperature of, for example, 900°–1,100°C. The pressure drop on the gas side of such a plant amounts to only about 10 mm. $H_2O$ column. The brief contact period between the hot gas and the solution to be concentrated in the jet scrubber, in conjunction with the cocurrent conductance of gas and liquid, prevents the undesired oxidation of ammonium thiocyanate according to the equation:

$NH_4SCN + O_2 \rightarrow HCN + SO_2 + NH_3$ and the subsequent entrance of the hydrogen cyanide into the gaseous phase.

The process of this invention is particularly applicable to the scrubbing solution stemming from the "Fumax" process for the desulfurization of coke-oven gas, which solution contains ammonium thiocyanate, ammonium thiosulfate, elementary sulfur, and minor amounts of ammonium polysulfide, ammonia, and ammonium sulfide. Preferably, this scrubbing solution is mixed with an amount of sulfuric acid chemically equivalent to the content in the solution of free ammonia and ammonia bound to the sulfide and polysulfide. By this sulfuric acid addition step, at least those acids whose disassociation constant, at room temperature, is less than about $1 - 5 \times 10^{-2}$, are liberated from the ammonium salts thereof. Thiocyanic acid and thiosulfuric acid have dissociation constants of $1.42 \times 10^{-1}$ and $1 \times 10^{-2}$, respectively (second hydrogen atom), and are present as ammonium salts after adding the sulfuric acid and are combusted as such in accordance with the above-indicated equations.

The invention will be explained below with reference to the drawing which shows a schematic flow diagram of a plant for conducting the process of this invention.

The scrubbing solution is distributed through conduit 7 at the head of an empty tower 6 and evaporated in the tower countercurrently to the hot combustion gas. The concentrated solution is withdrawn at the bottom of tower 6 via conduit 1 and introduced through nozzles into the main chamber 4a of a combustion furnace 4. At the same time, the main chamber 4a is fed with fuel oil via conduit 2 and with combustion air via conduit 3. In the chamber 4a, the combustible components of the solution are burned to $SO_2$, $N_2$, $H_2O$, and $CO_2$ and the water of the solution is vaporized. The combustion gas then flows into the afterburning chamber 4b after a further amount of air has been added thereto. At this point, the combustion gas contains $SO_3$. The amount thereof depends on the oxygen content in the combustion gas.

After exiting from furnace 4, the hot combustion gas flows through conduit 5 into the evaporation tower 6 wherein it gives off heat to the solution fed at 7 and evaporates water from the solution. Simultaneously, $SO_3$ is scrubbed out of the combustion gas. The sulfuric acid formed from the $SO_3$ in the scrubbing solution binds ammonia, so that the latter cannot pass over into the combustion gas. Some ammonium thiosulfate is decomposed at the same time. During this process, sulfur is separated with the binding of $H_2S$. The combustion gas, laden with water vapor, leaves the evaporation tower 6 via conduit 8 and is cooled in the cooling and scrubbing tower 9 to 25°–50°C. The heat of condensation is constantly removed from the recycled cooling liquid by means of cooler 10. The condensate is withdrawn at 12. The thus-cooled combustion gas is conducted through conduit 11 to the main stage 13 and the secondary stage 14 of the electrostatic mist removal stage. The thus-obtained condensates are combined with the recycled solution of the condensation stage 9, 10. At 15, the demisted gas is withdrawn and is fed, after passing through a drying tower, not shown, to a conventional contact oxidation plant for sulfuric acid production.

Without further elaboration, it is believed that one skilled in the art can, using the preceding description, utilize the present invention to its fullest extent. The following preferred specific embodiments are, therefore, to be construed as merely illustrative and not limitative of the remainder of the specification and claims in any way whatsoever.

EXAMPLE 1

Employing the equipment shown in the drawing, a scrubbing solution from the Fumax process is utilized, containing 10.1% by weight of ammonium thiocyanate, 2.4% by weight of ammonium-thiosulfate, 2.9% by weight of sulfur, 0.5% by weight of ammonia, 0.2% by weight of ammonium polysulfide, and 83.9% by weight of water. The density of the solution is 1.04. To that solution 20 g. of $H_2SO_4$ per liter is added. The solution is concentrated with the hot combustion gas to a solution consisting of 20.7% by weight of salts, 4.3% by weight of sulfur, and 75% by weight of water.

1.33 tons of this solution is combusted at 1,000° C. with 2175 Nm³ of air and 56 kg. of heavy oil (net heat of combustion = 10,000 kcal./kg.). The air is preheated to 500° C. A moist combustion gas (3696 Nm³) is obtained with a temperature of about 950° C. and during the concentration of the scrubbing solution, it absorbs 709 Nm³ of steam, thus being cooled to about 630° C. After drying, 2132 Nm³ of a gas is produced with 5.4% by volume of $SO_2$ and 3.5% by volume of $O_2$. The gas is processed in accordance with the contact method to 340 kg. of $H_2SO_4$. The yield is 185 kg. of $H_2SO_4$ per ton of scrubbing solution. In this process, the final gas from the sulfuric acid contact plant is scrubbed with ammonia, and this scrubbing solution is also combusted together with the scrubbing solution from the Fumax process.

EXAMPLE 2

The same scrubbing solution as in Example 1 is processed with the addition of 20 g. of $H_2SO_4$ per liter, but effecting a concentration to 65% by weight of water. The cracked gas is cooled from 950° to 160° C. during this step. After drying, the gas contains 8.0% by volume of $SO_2$ and 3.3% by volume of $O_2$. The combustion is conducted without adding fuel, merely using the combustible components of the scrubbing solution. The product is 476 kg. of $H_2SO_4$, corresponding to 357 kg. of $H_2SO_4$ per ton of concentrate.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of sulfur dioxide from a scrubbing solution obtained by desulfurization of coke-oven gas with ammonia, said scrubbing solution comprising ammonium thiocyanate, ammonium thiosulfate, sulfur, free ammonia and ammonium salts of weak acids having a dissociation constant at room temperature of less than about $1 - 5 \times 10^{-2}$, which comprises:

a. admixing said scrubbing solution with an amount of sulfuric acid sufficient to react with both said free ammonia and said ammonium salts of said weak acids to form ammonium sulfate under conditions such that said ammonium thiocyanate and ammonium thiosulfate remain in solution;

b. concentrating the resultant scrubbing solution to a water content of about 40–78% by weight under conditions to substantially prevent undesired oxidation of ammonium thiocyanate according to the equation $NH_4SCN + O_2 \rightarrow HCN + SO_2 + NH_3$ and the subsequent entrance of HCN into the gaseous phase; and c. combusting the thus-concentrated solution to form sulfur dioxide according to the following reactions:

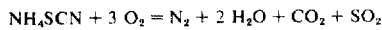

$NH_4SCN + 3\ O_2 = N_2 + 2\ H_2O + CO_2 + SO_2$

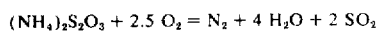

$(NH_4)_2S_2O_3 + 2.5\ O_2 = N_2 + 4\ H_2O + 2\ SO_2$

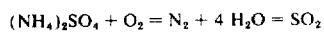

$(NH_4)_2SO_4 + O_2 = N_2 + 4\ H_2O = SO_2$

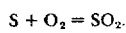

$S + O_2 = SO_2$.

2. A process according to claim 1 wherein the residence time of the evaporated mixture in the combustion zone is about 0.3–15 seconds.

3. A process according to claim 1 wherein an oxygen content of 1–5% by volume is maintained in the exit combustion gas.

4. A process according to claim 1 wherein the concentrated solution is combusted at a temperature of of 800°–1250° C.

5. A process according to claim 4 wherein the concentrating is conducted by direct heat exchange with the $SO_2$-containing gas produced by the combustion step.

6. A process according to claim 5 wherein the direct heat exchange of the scrubbing solution and the hot combustion gas is performed in a Venturi-type jet scrubber.

7. A process according to claim 6 wherein the concentrated solution is combusted at a temperature of 900°–1100° C.

8. A process according to claim 7 wherein an oxygen content of 1.2–3.5% by volume is maintained in the exit combustion gas.

9. A process according to claim 1 wherein sulfuric acid and water are condensed out of the combustion gas used in said concentration step by cooling and washing and at least a portion of the thus-obtained sulfuric acid is added to the starting scrubbing solution.

10. A process according to claim 1 wherein the amount of sulfuric acid which is added to the scrubbing solution is chemically equivalent to the content of free ammonia and ammonia bound to sulfide and polysulfide in the solution.

11. A process according to claim 1 wherein the scrubbing solution is concentrated to a water content of between about 60 and 75% by weight.

12. A process according to claim 1 wherein the amount of sulfuric acid which is added to the scrubbing solution is chemically equivalent to the content of free ammonia and ammonia bound to sulfide and polysulfide in the solution; the scrubbing solution is concentrated to a water content of between about 60 and 75% by weight in a Venturi-type jet scrubber; sulfuric acid and water are condensed out of the combustion gas used in said concentration step by cooling and washing and at least a portion of the thus-obtained sulfuric acid is added to the starting scrubbing solution; and the concentrated solution is combusted at a temperature from 900°–1100° C. while an oxygen content of 1–5% by volume is maintained in the exit combustion gas and the residence time of the evaporated mixture in the combustion zone is about 0.3–15 seconds.

* * * * *